United States Patent
Tomiyama et al.

(10) Patent No.: US 12,364,888 B2
(45) Date of Patent: Jul. 22, 2025

(54) FIRE EXTINGUISHING SHEET

(71) Applicant: YAMATO PROTEC CORPORATION, Tokyo (JP)

(72) Inventors: Shogo Tomiyama, Inashiki-gun (JP); Akimasa Tsutsumi, Inashiki-gun (JP)

(73) Assignee: YAMATO PROTEC CORPORATION, Osaka (JP)

( * ) Notice: Subject to any disclaimer, the term of this patent is extended or adjusted under 35 U.S.C. 154(b) by 0 days.

(21) Appl. No.: 17/793,994

(22) PCT Filed: Jan. 21, 2021

(86) PCT No.: PCT/JP2021/002036
§ 371 (c)(1),
(2) Date: Jul. 20, 2022

(87) PCT Pub. No.: WO2021/149766
PCT Pub. Date: Jul. 29, 2021

(65) Prior Publication Data
US 2023/0050941 A1    Feb. 16, 2023

(30) Foreign Application Priority Data

Jan. 22, 2020 (JP) ................ 2020-008038
Jan. 31, 2020 (JP) ................ 2020-014784

(51) Int. Cl.
| | |
|---|---|
| *A62C 8/06* | (2006.01) |
| *A62C 3/16* | (2006.01) |
| *A62C 99/00* | (2010.01) |
| *A62D 1/00* | (2006.01) |
| *A62D 1/06* | (2006.01) |
| *C08J 5/18* | (2006.01) |
| *C08K 3/16* | (2006.01) |
| *C08K 5/098* | (2006.01) |
| *H01M 10/613* | (2014.01) |
| *H01M 10/6554* | (2014.01) |
| *H01M 10/6561* | (2014.01) |

(52) U.S. Cl.
CPC ............ *A62C 8/06* (2013.01); *A62C 3/16* (2013.01); *A62C 99/0018* (2013.01); *A62D 1/0064* (2013.01); *A62D 1/06* (2013.01); *C08J 5/18* (2013.01); *C08K 3/16* (2013.01); *C08K 5/098* (2013.01); *H01M 10/613* (2015.04); *H01M 10/6554* (2015.04); *H01M 10/6561* (2015.04); *C08J 2329/14* (2013.01); *H01M 2200/10* (2013.01); *H01M 2220/10* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 5,588,493 A | 12/1996 | Spector et al. | |
| 7,905,296 B2 | 3/2011 | Bennett | |
| 2005/0242319 A1* | 11/2005 | Posson | A62D 1/06 252/2 |
| 2013/0181157 A1 | 7/2013 | Guo et al. | |
| 2015/0017491 A1 | 1/2015 | Specht et al. | |
| 2015/0246255 A1* | 9/2015 | Liu | A62D 1/00 252/5 |
| 2020/0377690 A1* | 12/2020 | Ootsuki | H01M 50/105 |
| 2021/0013460 A1 | 1/2021 | Ootsuki et al. | |

FOREIGN PATENT DOCUMENTS

| | | |
|---|---|---|
| EP | 3 412 344 A1 | 12/2018 |
| JP | S52-12719 A | 1/1977 |
| JP | S53-117714 U | 9/1978 |
| JP | H01-256640 A | 10/1989 |
| JP | 2013-541362 A | 11/2013 |
| JP | 2014-7089 A | 1/2014 |
| JP | 2019-33123 A | 2/2019 |
| WO | 2017/134703 A1 | 8/2017 |
| WO | 2017/187792 A1 | 11/2017 |
| WO | 2017/209202 A1 | 12/2017 |
| WO | 2018/012503 A1 | 1/2018 |
| WO | 2018/047762 A1 | 3/2018 |
| WO | 2019/163839 A1 | 8/2019 |

OTHER PUBLICATIONS

Translation of JP 2019033123 dated Feb. 2019.*
Keller et al. Water Vapor Permeation in Plastics. (Year: 2017).*
International Search Report dated Mar. 9, 2021, issued in counterpart International Application No. PCT/JP2021/002036 (3 pages).
Final Office Action dated Jul. 14, 2023, issued in U.S. Appl. No. 17/272,406. (12 pages).
Non-Final Office Action dated May 4, 2023, issued in U.S. Appl. No. 17/272,406. (16 pages).
International Search Report dated Oct. 21, 2019, issued in International Application No. PCT/JP2019/034401 (counterpart to U.S. Appl. No. 17/272,406). (2 pages).

* cited by examiner

*Primary Examiner* — Tanisha Diggs
(74) *Attorney, Agent, or Firm* — WHDA, LLP

(57) ABSTRACT

The present invention provides a fire extinguishing sheet suitable for productivity, mass production, and large-scale production, wherein the fire extinguishing sheet can be used in places, facilities, structures, etc., where a fire may occur, and has an initial fire extinguishing function. The fire extinguishing sheet according to the present invention contains a fire extinguishing agent that when a predetermined temperature is reached, thermally decomposes to generate a fire extinguishing component.

2 Claims, No Drawings

FIRE EXTINGUISHING SHEET

TECHNICAL FIELD

The present invention relates to a fire extinguishing sheet suitable for productivity, mass production, and large-scale production, wherein the fire extinguishing sheet can be used in places, facilities, structures, etc., where a fire may occur, and has an initial fire extinguishing function.

PRIOR ARTS

A fire extinguishing agent composition for generating an aerosol by combustion to extinguish or suppress fire is known (for example, Patent Literature 1). Such a fire extinguishing agent composition can be used, for example, as liquid form such as dispersion, or as solid form such as powder or molded product having a desired shape.

CITATION LIST

Patent Literature

Patent Literature 1: WO 2017/134703 A

SUMMARY OF INVENTION

Technical Problem

Here, it is said that the molded product described in Patent Document 1 is a so-called self-extinguishing molded product, but the manufacturing process has not been established, and there is still room for improvement from the viewpoint of productivity, mass production, and large-scale production.

Therefore, the object of the present invention is to provide a fire extinguishing sheet suitable for productivity m production, and large-scale production, wherein the fire extinguishing sheet can be used in places, facilities, structures, etc., where a fire may occur, and has an initial fire extinguishing function.

Solution to Problem

In order to solve the above-mentioned problems, the present invention provides a fire extinguishing sheet containing a fire extinguishing agent that, when reaching a predetermined temperature, thermally decomposes to generate afire extinguishing component.

In the fire extinguishing sheet of the present invention, it is preferable that the fire extinguishing component is an aerosol.

Further, in the fire extinguishing sheet of the present invention, it is preferable that the fire extinguishing agent contains at least a potassium compound and a binder.

Further, in the fire extinguishing sheet of the present invention, it is preferable that the potassium compound contains at least a potassium-containing organic compound and potassium chlorate.

Further, in the fire extinguishing sheet of the present invention, it is preferable that the binder is composed of one or two or more of polyester resin, polystyrene, polyolefin resin, polyurethane resin, polyisocyanate, polyimide resin, acrylic resin, cellulose-based compound, vinyl chloride, ethylene vinyl acetate copolymer, polyvinylidene fluoride resin, fluororesin binder, synthetic latex, rosin, epoxy resin, phenol resin, polyvinyl alcohol resin, polyvinyl acetal resin, olefin-based thermoplastic resin, butadiene-based thermoplastic resin, styrene-based thermoplastic resin, styrene-butadiene-based thermoplastic resin, isoprene-based thermoplastic resin, urethane-based thermoplastic resin, ester-based thermoplastic resin, amide-based thermoplastic resin, vinyl chloride-based thermoplastic resin, thermoplastic resin where process oil, tacky-imparting resin, etc. are mixed, alloy-type thermoplastic elastomer, a dynamically cross-linked thermoplastic elastomer, bentonite, and a biobinder Biopoly B.

Further, it is preferable that the fire extinguishing sheet of the present invention contains at least tripotassium citrate and potassium chlorate as the potassium compound and at least polyvinyl butyral as the binder.

Effects of the Invention

According to the present invention, it is possible to realize a fire extinguishing sheet suitable for productivity, mass production, and large-scale production, wherein the fire extinguishing sheet can be used in places, facilities, structures, etc., where a fire may occur, and has an initial fire extinguishing function.

Embodiments for Achieving the Invention

In the following, the fire extinguishing sheet according to a typical embodiment of the present invention will be described in detail.

The fire extinguishing sheet of the present embodiment contains a fire extinguishing agent that thermally decomposes to generate a fire extinguishing component when reaching a predetermined temperature. Alternatively, it may be said that the fire extinguishing sheet is a fire extinguishing agent molded into a sheet shape. The fire extinguishing sheet of the present embodiment generates an aerosol as a fire extinguishing component. The fire extinguishing sheet contains at least a potassium compound and a binder in the fire extinguishing agent.

More specifically, the fire extinguishing agent contains, for example, 0.5 to 30% by mass of a binder (component A) and 10 to 70% by mass of a chlorate (component B), and further, contains 30 to 900 parts by mass of a potassium salt (component C) with respect to 100 parts by mass of the total amount of the fuel and the chlorate, and has a thermal decomposition start temperature in the range of more than 90° C. to 450° C.

Preferred examples of the binder for the component A is at least one of polyester resin, polystyrene, polyolefin resin, polyurethane resin, polyisocyanate, polyimide resin, acrylic resin, cellulose-based compound, vinyl chloride, ethylene vinyl acetate copolymer, polyvinylidene fluoride resin, fluororesin binder, synthetic latex, rosin, epoxy resin, phenol resin, polyvinyl alcohol resin, polyvinyl acetal resin, olefin-based thermoplastic resin, butadiene-based thermoplastic resin, styrene-based thermoplastic resin, styrene-butadiene-based thermoplastic resin, isoprene-based thermoplastic resin, urethane-based thermoplastic resin, ester-based thermoplastic resin, amide-based thermoplastic resin, vinyl chloride-based thermoplastic resin, thermoplastic resin where process oil, tacky-imparting resin, etc. are mixed, alloy-type thermoplastic elastomer, a dynamically cross-linked thermoplastic elastomer, bentonite, and a biobinder Biopoly B. The component A can also be said to be fuel.

The chlorate of component B is a strong oxidizing agent, and is a component for generating thermal energy by combustion with a potassium salt of component C to generate an aerosol (potassium radical). This aerosol releases a potassium radical (potassium compound), which is a fire extinguishing component, and breaks the combustion chain by a negative catalytic effect to realize quick fire extinguishing.

Here, the content ratio of the binder of the component A and the chlorate of the component B in the total 100% by mass is as follows.

Component A: 0.5 to 30% by mass,
preferably 1 to 20% by mass,
more preferably 3 to 10% by mass,
Component B: 70 to 99.5% by mass,
preferably 80 to 99% by mass,
more preferably 90 to 97% by mas Next, the potassium salt of the component C is a component for generating an aerosol (potassium radical) by the thermal energy generated by the combustion of the component B.

As the potassium salt for the component C, preferable is, for example, at least one selected from potassium acetate, potassium propionate, monopotassium citrate, dipotassium citrate, tripotassium citrate, monopotassium trihydrogen ethylenediaminetetraacetate, dipotassium dihydrogen ethylenediaminetetraacetate, tripotassium monohydrogen ethylenediaminetetraacetate, tetrapotassium ethylenediaminetetraacetate, potassium hydrogen phthalate, dipotassium phthalate, potassium hydrogen oxalate, dipotassium oxalate, potassium hydrogen carbonate and potassium bicarbonate.

The content ratio of the C component is preferably 50 to 500 parts by mass, and more preferably 100 to 300 parts by mass with respect to 100 parts by mass of the total amount of the component A and the component B.

Furthermore, the fire extinguishing agent composition of the present embodiment is a composition having a thermal decomposition start temperature in the range of more than 90° C. to 450° C., preferably 150° C. to 260° C. Such a range of the thermal decomposition start temperature can be adjusted by combining the above-mentioned component A, component B and component C in the above ratio.

A molded product such as a sheet of fire extinguishing agent may be produced by mixing each component of the above fire extinguishing agent composition, molding into a sheet while controlling the coating conditions, and appropriately drying. The dimensions such as the thickness and area of the sheet-shaped fire extinguishing agent may be appropriately adjusted depending on the fire extinguishing objects such as facility, equipment, machine, tool, and structure to be used, and the intended use. It is also possible to stack and use a plurality of sheet-shaped fire extinguishing agents.

Further, the sheet-shaped fire extinguishing agent of the present invention may be installed at a place to be easily ignited of fire extinguishing objects such as facility, equipment, machine, tool, and structure. For example, in the case of equipment, and tools, the sheet-shaped fire extinguishing agent may be placed in contact with or adjacent to a battery cell including secondary batteries such as a lithium-ion battery that may ignite due to some trouble such as an unexpected accident, and its case, an ignitable member such as an electrode, a connection terminal, and a circuit board. Of course, it may be arranged in a plurality of places.

The fire extinguishing agent of the present invention may be sealed inside the objects such as facility, equipment, machine, tool, and structure in order to realize a fire extinguishing action by the above-mentioned aerosol. Further, it may be sealed together with a member that can ignite as described above.

The thickness of the fire extinguishing sheet of the present invention can be appropriately set according to the fire extinguishing object, the installation location, the composition, the mixing ratio, etc. of the fire extinguishing sheet, for example, may be 1 mm or less, can be 10 to 1000 μm, may be 50 to 500 μm.

Furthermore, the present invention also relates to a fire extinguishing laminated body including the above-mentioned fire extinguishing agent sheet (fire extinguishing sheet or fire extinguishing agent layer) of the present invention and a base material such as paper, resin or metal in this order (in this case, it can be used with or without peeling the base material). Further, it may be a fire extinguishing laminated body having a structure in which the fire extinguishing agent layer is laminated between a pair of base materials (in this case, it is available even if one base material is peeled off or both base materials are peeled off).

Examples of the resin base material include polyester (PET, etc.), polyolefin (LLDPE, PP, COP, CPP, etc.), PVC, PVA, acrylic resin, epoxy resin, polyamide, polyimide, polycarbonate (PC), fluororesin (PTFE, ETFE, EFEP, PFA, FEP, PCTFE, etc.) and the like. From the viewpoint of low water vapor transmission rate and easy suppression of deterioration of the component C, preferable are PET, LLDPE, PP, COP, CPP, PVC, PC, PTFE, ETFE, EFEP, PFA, FEP or PCTFE.

In the resin base material, the water vapor permeability (conformed to JISK7129, 40° C./90% RH conditions) may be controlled from the viewpoint of water vapor barrier property, and it can be appropriately adjusted (for example, 200 g/m$^2$/day or less) by, according to conventionally known techniques, for example, the thickness, the molecular weight of the resin, surface treatment, formation of a metal oxide layer (for example, an alumina vapor deposition layer or a silica vapor deposition layer), or the like. From the viewpoint of using the fire extinguishing component that generates an aerosol by combustion, it may be, for example, 0.01 g/m$^2$/day to 150 g/m$^2$/day.

Examples of the metal base material include aluminum, iron, copper, stainless steel of their alloy, duralumin, zinc-plated steel and the like. Such a metal base material may be in the form of a sheet or a foil.

The above-mentioned base material may contain, for example, an organic phosphorus compound (FR), an epoxy compound, an aramid compound, an amide compound, a silicon compound, and carbon, a fiber of an aramid compound, an amide compound, a silicon compound, and carbon, or the like, and further may have an unevenly shaped surface to be treated. When the surface to be treated has such an uneven shape, it is possible to improve the adhesion and adhesiveness between the base material and the fire extinguishing agent layer. Such an uneven shape can be formed by a molding method (for example, an injection molding method, a press molding method, etc.) in the manufacturing process of the base material.

Further, the base material may be, for example, a base material composed of a fiber layer containing organic fibers and/or inorganic fibers having high strength and heat resistance. In this case, the base material made of the fiber layer may be partially impregnated with the fire extinguishing agent layer. Therefore, the fire extinguishing laminated body of the present invention may include the fiber layer and the resin layer, and may have a structure in which the fire extinguishing agent is contained in at least one of the fiber layer and the resin layer.

An adhesive layer (a layer formed of an adhesive) may be provided between the base material and the fire extinguishing agent layer. In this case, the end face of the fire extinguishing agent layer and the end face of the adhesive layer may or may not be flush with each other. When the adhesive squeezes out from the end face of the fire extinguishing agent layer, the squeezed adhesive can bond and seal the base materials to be the outermost layer.

As the adhesive constituting the adhesive layer, conventionally known adhesives can be used, and for example, an adhesive such as an epoxy resin, an acrylic resin or a urethane resin can be used. An epoxy resin may be used from the viewpoint of water vapor barrier property. The thickness of the adhesive layer may be, for example, 1 to 100 µm, preferably 2 to 50 µm.

Further, the present invention also relates to, for example, a fire extinguishing agent slurry (fire extinguishing agent paint) used as a raw material of the fire extinguishing sheet or the fire extinguishing agent layer in the production of the above-mentioned fire extinguishing sheet of the present, invention.
Considering storage ability stability, handling ability, etc., it is preferable to adjust so that the fire extinguishing agent slurry has a viscosity of 10 to 200,000 Pa·s (preferably 500 to 2000 Pa·s) at a shear rate of 50 s$^{-1}$ and a solid content concentration of 20 to 80% by mass (preferably 40 to 60% by mass).

EXAMPLE

In the following, the present invention will be described in more detail with reference to Examples and Comparative Examples. In the Examples and Comparative Examples, a sheet-shaped fire extinguishing agent was prepared as described in the following (1).
(1) Production of Sheet-Shaped Fire Extinguishing Agent
(1-1) Preparation of Binder
Polyvinyl butyral, which is a binder, is dissolved in the solvent N-methylpyrrolidone to prepare an 18% by mass solution of polyvinyl butyral.
(1-2) Production of Fire Extinguishing Agent Slurry by Powder Crushing
187.5 g of tripotassium citrate (component C: potassium-containing compound as an aerosol generator), 112.5 g of potassium chlorate (component B: oxidizing agent), 200 g of N-methylpyrrolidone (component A: binder) and 2 kg of alumina balls having a particle size of 5 mm as a dispersion medium are placed in a 2 liter container, and stirred and pulverized for about 24 hours with a ball mill set at 60 rpm to obtain a fire extinguishing agent slurry.
(1-3) Paint (Adding a Binder to the Fire Extinguishing Agent Slurry)
111 g of a 18% by mass solution of the above polyvinyl butyral (1-1) is added to the total amount of the above fire extinguishing agent slurry (1-2), and stirred with a ball mill set at 60 rpm for about 24 hours to obtain a paste-like (mayonnaise-like) paint having a thixo property. If the viscosity of the produced paint falls within the range of 2000 to 3000 mPa·S in the B-type viscometer in which the load (torque) is set to 50% and the step can proceed to the next separation step.
(1-4) Separation (Removal of Dispersed Media)
By using an appropriate stainless steel gold colander, the paint obtained in the above (1-3) and the dispersed media are separated. If the yield is within the range of 50 to 60%, the step can proceed to the next filtration step.
(1-5) Filtration (Separation of Large Particle Size Chemicals and Dust)
The paint obtained in the above separation step (1-4) is filtered through a 100 mesh stainless steel mesh (opening of about 200 µm) to remove coarse particles and dust.
(1-6) Coating (Sheeting of Paint)
A PET film having a thickness of 100 µm and provided with a film of Si or F for release treatment is laid on the table of the coating machine "β coater" manufactured by Yasui Seiki Co., Ltd., and the fire extinguishing agent slurry is applied thereto. A round applicator having a gap of 400 µm was attached as a coating jig (applicator). Application step is performed to a PET sheet (resin base material) at a coating speed of about 0.5 mm/min.
(1-7) Drying Step (Removal of Solvent)
The solvent is removed by using a general circulating constant temperature oven. A drying step was performed at a set temperature of 100° C. while the chemical was applied on the PET film to obtain a sheet having an average thickness of 220 µm.
(1-8) Cutting Step
After cooling, the chemical agent applied to the PET film is cut into A4 size (width 210 mm×length 297 mm) with a cutting machine and subjected to an evaluation test.
(2) Evaluation Test of Sheet-Shaped Fire Extinguishing Agent
The fire extinguishing agent produced in the above procedure (1) was tested as follows.
(2-1) Placement of Lithium-Ion Battery Cell
A lithium ion battery cell of 3 Ah is placed of 100 mm in width×100 mm in length×5 mm in height in the center of a box-shaped container made of SUS304 having a width of 300 mm×length of 300 mm×height of 100 m and a plate thickness of 1.2 mm.
(2-2) Pasting of Fire Extinguishing Sheet
An acrylic plate having a width of 350 mm×length of 350 mm×10 mm and a plate thickness of 5 mm which has a hole of Φ10 in the center was placed as the top plate of the above box-shaped container (2-1). The A4 size fire extinguishing sheet produced in the (1) was sticked to the center of one side of the acrylic plate with spray glue.
(2-3) Fixing the Acrylic Plate
The acrylic plate was placed and fixed in the box-shaped container so that the sticking side of the fire extinguishing sheet facing is downward.
(2-4) Nail Insertion
A Φ5 iron nail was inserted into the opening of the acrylic top plate at a constant speed to penetrate the internal cell. A flash of light was emitted for a moment when being short-circuited, but white smoke derived from the fire extinguishing sheet was immediately emitted, and the fire was extinguished without spreading.

COMPARATIVE EXAMPLE

In the above evaluation test (2), when the operation of the lithium-ion battery cell nail insertion evaluation test was carried out as described in the above (2-4) without sticking the above A4 fire extinguishing sheet (2-2) to the acrylic top plate, the lithium ion battery cell in the SUS container exploded violently and caused a fire, and the inside of the container was covered with flame and continued to burn for 5 minutes.

The representative embodiments of the present invention have been described above, but the present invention is not limited only to these embodiments, and various design changes are possible, and those are included in the present invention.

For example, the fire extinguishing sheet, laminated body, fire extinguishing agent and slurry of the present invention can be applied to facility, equipment, machine, tool, structure, battery and the like as described above, and may be installed in contact with or adjacent to, for example, an ignitable member such as an electrode, a connection terminal, or circuit board.

In addition, the fire extinguishing sheet, laminated body, fire extinguishing agent, and slurry of the present invention may also be suitably used for various other industrial materials such as various power sources, motors, switchboards, control panels, kitchen members, building materials, automobile parts, aircraft parts, electronics parts, and the like.

The invention claimed is:

1. A fire extinguishing sheet comprising:
a base material made of a material selected from the group consisting of polyester, polyolefin, PVC, polycarbonate and fluororesin, the base material having a water vapor permeability of 0.01 $g/m^2$/day to 150 $g/m^2$/day; and
a fire extinguishing agent layer provided on the base material, the fire extinguishing agent layer thermally decomposes when reaching a temperature to generate a fire extinguishing component of an aerosol, the fire extinguishing agent layer in the fire extinguishing sheet consisting of:
tripotassium citrate,
potassium chlorate, and
polyvinyl butyral.

2. A fire extinguishing sheet comprising:
a base material made of a material selected from the group consisting of aluminum, iron, copper, stainless steel of their alloy, duralumin, zinc-plated steel; and
a fire extinguishing agent layer provided on the base material, the fire extinguishing agent layer thermally decomposes when reaching a temperature to generate a fire extinguishing component of an aerosol, the fire extinguishing agent layer in the fire extinguishing sheet consisting of:
tripotassium citrate,
potassium chlorate, and
polyvinyl acetal resin.

* * * * *